June 23, 1953 R. R. STEVENS 2,642,969
FLUID PRESSURE CONTROL APPARATUS
Filed Sept. 22, 1948

INVENTOR.
Roy R. Stevens
BY
Adelbert A. Steinmiller
ATTORNEY

Patented June 23, 1953

2,642,969

UNITED STATES PATENT OFFICE 2,642,969

FLUID PRESSURE CONTROL APPARATUS

Roy R. Stevens, Forest Hills, Pa., assignor to Westinghouse Air Brake Company, a corporation of Pennsylvania Application September 22, 1948, Serial No. 50,596

16 Claims. (Cl. 192—12)

This invention relates to fluid pressure control apparatus and more particularly to fluid pressure apparatus for controlling operation of an engine power package, such as may be employed in rotary oil well drilling equipment.

A power package of the above type may comprise a plurality of power units such as a pair of internal combustion engines adapted to be operably connected to a multiple speed transmission for operative connection with a draw works hoisting drum, sand reel, rotary table, etc. The transmission may comprise friction clutches and positive jaw type clutches adapted to be engaged and disengaged selectively for effecting respective changes in speed ratio from input to output of the transmission system.

It is one object of the invention to provide fluid pressure control apparatus for controlling operation of the above mentioned engines and for selectively effecting operative connection between one or all of said engines and the transmission for driving same while automatically assuring synchronism of the power output of the engines when all are thus employed.

It is another object of the invention to provide fluid pressure control apparatus for selectively controlling engagement of respective friction and jaw clutches and automatically assuring that the jaw clutches may be engaged or disengaged only when the rotatable parts thereof are turning at sufficiently low speed as will not cause shock to said clutches and equipment.

Other objects and advantages will be apparent from the following more detailed description of the invention.

In the accompanying drawing, the single figure is a diagrammatic view, partly in outline and partly in section, of a power package or unit embodying the invention.

Description

Figure 1:
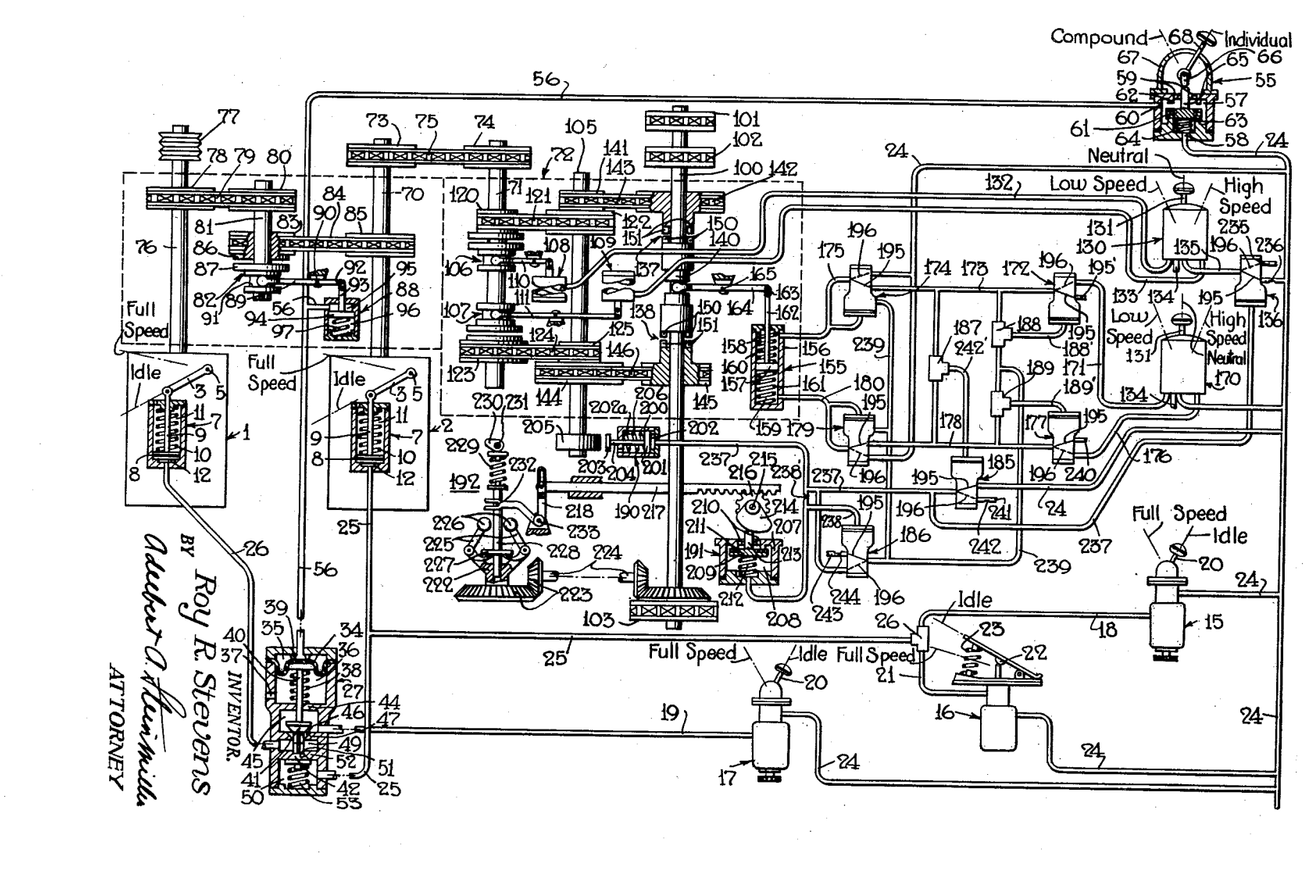

Referring to the drawing, the reference numerals 1 and 2 designate two alike internal combustion engines (two engines being employed merely to illustrate the invention) each comprising speed control means (not shown) adjustable in accord with position of a respective governor control lever 3. Lever 3 is operatively connected to a governor shaft 5 and is adapted for pivotal movement thereabout to and between opposite extreme limit position, "Idle" and "Full speed," indicated by dot and dash lines so titled in the drawing, for adjusting the governor device through turning movement of shaft 5 to effect adjustment of the speed of the respective engine accordingly.

For adjusting position of lever 3, a fluid pressure cylinder device 7 is provided which comprises a piston 8 which is operatively connected by means of a piston rod 9 to said lever. A control spring 10 is disposed in a spring chamber 11 at one side of piston 8, arranged to urge said piston in the direction of a pressure chamber 12 at its opposite side toward a rest position in which it is shown in the drawing with lever 3 in "Idle" position. Piston 8 will effect positioning of lever 3 in accord with the degree of pressure of fluid supplied to the chamber 12 acting thereon to oppose action of spring 10. "Full speed" position of lever 3 will correspond to a certain maximum pressure of fluid in chamber 12 and "Idle" position to a certain minimum pressure in said chamber.

For effecting variation in pressure of fluid in the respective pressure chambers 12 in the cylinder devices 7, and thereby effecting adjustment of the speed of engines 1, 2, self-lapping control valve devices 15, 16, 17 are provided.

The self-lapping control valve devices 15, 16, 17 may be substantially similar to a control valve device disclosed and described in Patent No. 2,398,877, issued to A. J. Bent, April 23, 1946, and assigned to the assignee of the present application. Self-lapping control valve devices 15, 17 are operable to effect variations in pressure of fluid in respective pipes 18, 19 in accord with position of an operator's handle 20, while self-lapping control valve device 16 is operable to effect variation in pressure of fluid in a pipe 21 in accord with position of a foot pedal 22. The handles 20 are movable to and between opposite limit positions corresponding to "Idle" and "Full speed" positions of the governor levers 3 in the engines 1, 2. Likewise, foot pedal 22 may be so positioned also to and between such limit positions, indicated by dot and dash lines so titled. "Idle" position of handles 20 and of foot pedal 22 corresponds to a certain minimum pressure of fluid in respective pipes 18, 19, 21, while "Full speed" position of said handles and foot pedal correspond to a certain maximum pressure of fluid in these pipes. Handles 20 will remain in any position to which they are moved, while foot pedal 22 is constantly urged toward its "Idle" position by action of a spring 23. A fluid pressure supply pipe 24, adapted to be connected to a source of fluid under pressure, such as a compressor (not shown), is connected to each of the self-lapping control valve devices 15, 16, 17 for conveying fluid under pressure thereto.

Pipes 18, 21 are connected in common to a pipe 25 by way of a double check valve 26 in such a manner that pressure of fluid in said pipe 25 may be varied either by operation of valve devices 15 or 16 independently, or a pressure at some value may be established and held therein by fixing a position of handle 20 in device 15 and effecting variation in pressure above that value by adjusting position of foot pedal 22 in device 16, thus affording flexibility of operation.

Pipe 25 is constantly connected to the pressure chamber 12 in the cylinder device 7 on the engine 2, and according to a feature of the invention, is adapted to be connected to the corresponding chamber in cylinder device 7 on engine 1, by way of a pipe 26 and a relay valve device 27, so that variation in pressure of fluid in pipe 25 will effect simultaneous synchronous adjustment of speed on both engines 1, 2 through operation of either of the valve devices 15, 16. Relay valve device 27 is also operable to disconnect pipe 25 from pipe 26 and to connect the latter pipe to the pipe 19 so that the speed of engine 1 will then be under the control of valve device 17, with the speed of engine 2 under control of either or both of valve devices 15, 16.

The relay valve device 27 may be of usual construction comprising a casing in which is clamped a diaphragm 34. At one side of diaphragm 34 there is a control pressure chamber 35 adapted to be supplied with fluid under pressure for urging said diaphragm to deflect in the direction of a chamber 36 at its opposite side. Chamber 36 is connected to a port 37 opening outwardly through the casing. A control spring 38 is disposed in chamber 36 adapted and arranged to urge diaphragm 34 in the direction of control chamber 35 toward its rest position in contact with a shoulder 39 formed in the casing, in which position it is shown in the drawing. A stem 40 is secured for reciprocable movement with deflection of diaphragm 34 for actuating two valves 41, 42. Stem 40 projects through chamber 36 and is slidably guided in a bore which opens through a partition 44 dividing chamber 36 from a chamber 45. The projecting end of stem 40 has an operating connection with valve 41 which is disposed in the chamber 45. By reciprocable movement of stem 40, valve 41 is brought into and out of seating engagement with a valve seat 46 formed at one end of a bore extending through a partition 47 which separates the chamber 45 from a chamber 49. The valve 42 is disposed in a chamber 50 and arranged to cooperate with a seat 51 formed at one end of a bore extending through a partition 52 which separates chamber 49 from the chamber 50. Valves 41, 42 are secured to respective fluted stems slidably mounted in the bores extending through partitions 47, 52. A bias spring 53 is arranged to urge valve 42 to a seated position closing chamber 50 from chamber 49, while, through contact with the fluted stems, valve 41 is at the same time urged away from seat 46, opening chamber 45 to the chamber 49.

When fluid under pressure is supplied to the control chamber 35 in relay valve device 27, through consequent deflection of diaphragm 34 and thereby movement of stem 40, the valve 41 is seated and the valve 42 is unseated. Chamber 49 is thus closed off from chamber 45 and open to chamber 50.

When fluid under pressure is released from control chamber 35, the relay valve device will assume the position in which it is shown in the drawing with valve 42 seated and valve 41 unseated. At this time, chamber 49 is open to chamber 45 and closed to chamber 50.

Pipe 19 is connected to chamber 45 in relay valve device 27, pipe 25 is connected to chamber 50 in said device and pipe 26 is connected to the chamber 49 in said device. A control valve device 55 is arranged to control supply and release of fluid under pressure to and from the control chamber 35 in relay valve device 27 by way of a pipe 56 connected to said chamber.

Valve device 55 may comprise a casing having a chamber 57, a supply opening 58 at one end connected to the supply pipe 24, an exhaust opening or openings 59 open to atmosphere, and a delivery opening 60 intermediate openings 58, 59 and connected to the pipe 56. A double faced valve 61 is disposed in chamber 57 arranged to cooperate with oppositely disposed seats 62, 63 encircling openings 59, 58, respectively, to control communication between chamber 57 and said openings. Valve 61 is urged toward a position seated on seat 62 by action of a compression spring 64. A stem 65 is attached to valve 61 through which said valve may be actuated. A cam 66, disposed within a cap 67 secured to the casing, is arranged to be turned about a pivotal connection with said cap for actuating stem 55. An operator's handle 68 is attached to cam 66 for effecting turning movement of same. Handle 68 extends outwardly through a slot formed in the cap 67, the opposite ends of which slot may serve to define two positions of the handle, "Compound" and "Individual," indicated in the drawing by dot and dash lines so titled.

In "Individual" position of handle 68, in which it is shown in the drawing, valve 61 is seated by cam 66 on seat 63 with pipe 24 closed from chamber 57 and pipe 56 open to atmosphere via said chamber and the ports 59. Relay valve device 27 is therefore positioned as shown in the drawing with the pipe 26 consequently connected to pipe 19 so that the speed of engines 1, 2 may be controlled individually, as will be appreciated from previous description.

When handle 68 in device 55 is moved from "Individual" to "Compound" position, valve 61 seats by spring 64 on seat 62, closing ports 59 and opening port 58. Fluid under pressure from pipe 24 will then flow into pipe 56 to relay valve device 27 which will respond to disconnect pipe 19 from pipe 26 and connect the latter pipe to pipe 25 so that the speed of both engines 1, 2 may be controlled simultaneously in synchronism by operation of either or both valve devices 15, 16, as previously described.

Engine 2 is adapted and arranged to drive a shaft 70, and thereby to drive an input shaft 71 of a variable speed transmission 72 through the medium of sprocket wheels 73, 74, secured for rotation with shafts 70, 71, respectively, and a chain 75.

Engine 1 is adapted and arranged to drive a shaft 76 which may be provided with a pulley 77 or the like to allow for operative connection to a mud pump (not shown), for example, such as is employed in rotary drilling rig equipment. Shaft 76 is arranged to be connected to the shaft 70 of engine 2 through a sprocket wheel 78 secured to shaft 76, a chain 79, a sprocket wheel 80 secured to a shaft 81, a friction clutch 82, a sprocket wheel 83, a chain 84, and a sprocket wheel 85 secured for rotation with the shaft 70.

One friction element 86 of the friction clutch 82 is secured to the sprocket wheel 83. Sprocket wheel 83 and friction element 86 are free to rotate on shaft 81 which extends therethrough. A second friction element 87 of clutch 82, disposed opposite and parallel to element 86 in its disengaged position in which it is shown in the drawing, is secured for rotation with shaft 81 and is slidable axially thereof into engagement with element 86 for transmitting torque thereto from shaft 70.

Friction clutch 82 is arranged to be operated by a fluid pressure clutch actuator 88 through a lever 89 which is fulcrumed intermediate its ends on a fixed pin 90. A yoke attached to one end of lever 89 provides for operative connection with the friction element 87 of clutch 82, an integral sleeve in which is formed an annular groove 91, said element being provided for receiving said yoke. The opposite end of lever 89 may be connected through a link 92 to one end of a rod 93 of the clutch actuator 88. Actuator 88 comprises a casing containing a piston 94 which is connected to the rod 93. At one side of piston 94 there is a chamber 95 connected to the pipe 56, while at its opposite side there is a spring chamber 96 which is constantly open to the atmosphere. A release spring 97 is disposed in chamber 96 arranged to urge piston 94 in the direction of chamber 95 toward its rest position seated on an annular shoulder formed in the casing, in which position it is shown in the drawing. In rest position of piston 94, clutch 82 is in its release position with element 87 disengaged from element 86. When fluid under pressure is supplied to chamber 95, piston 94 is caused to move in the direction of chamber 96 against action of spring 97, and through stem 93, link 92, and lever 89 it causes engagement of element 87 with element 86 in friction clutch 82 for coupling shaft 81 to shaft 70 through sprocket wheels 83, 85 and chain 84. When fluid under pressure is subsequently vented from chamber 95 in actuator 88, spring 97 returns piston 94 to rest position and causes clutch 82 to disengage.

According to a feature of the invention, engagement of the clutch 82 is effected to connect the shaft 76 of engine 1 to the shaft 70 of engine 2, through supply of fluid under pressure to pipe 56, at the same time that the speed of both engines 1, 2 is brought under the control of control valve devices 15 and 16 and is thereby synchronized. Conversely, disengagement of clutch 82 is effected automatically, through release of fluid under pressure in pipe 56, at the same time that speed of the engines 1, 2 are rendered controllable individually through operation of valve devices 15, 16 and the valve device 17, respectively.

By means of such an arrangement, an operator of the equipment may compound or render independent both control of and output of the engines 1, 2 merely by positioning handle 68 in valve device 55.

An output shaft 100 is provided the transmission 72 to which power supplied to drive its input shaft 71 may be transmitted for operative connection with devices to be operated or driven. The output shaft 100 is provided with sprocket wheels 101, 102, 103 secured for rotation therewith for operative connection to a rotary table, sand reel, and draw works hoisting drum (none of which are shown) on a rotary well drilling rig, for example. It is understood that in such an application clutches would be employed in the driving connection with the various devices to provide for necessary flexibility and their independent operation.

The variable speed transmission 72 may by way of example be adapted and arranged to provide four different ratios of speed of rotation of its input shaft 71 to speed of rotation of its output shaft 100.

Transmission 72 may comprise an intermediate shaft 105 arranged to be driven at one or the other of two operating speeds through selective engagement of two friction clutches 106, 107 adapted to be driven by input shaft 71. Clutches 106, 107 may be similar to the clutch 82, previously described, and are operable in similar fashion by means of respective fluid pressure clutch actuators 108, 109, respectively, which are similar to the actuator 88. Clutch 106 is engaged through a lever 110 when fluid under pressure is supplied to actuator 108, and the clutch 107 is engaged through a lever 111 when fluid under pressure is supplied to the actuator 109. Conversely, clutches 106, 107 are disengaged when fluid under pressure is vented from actuators 108, 109, respectively.

In fashion similar to that described in regard to operation of clutch 82, when clutch 106 is engaged, shaft 71 is operatively connected to a sprocket wheel 120 which is in turn connected through a chain 121 and sprocket wheel 122 to the shaft 105. Sprocket wheel 120 is journaled onto shaft 71 so that when clutch 106 is disengaged said shaft is free to turn therein relative thereto, while sprocket wheel 122 is secured for rotation with shaft 105.

Similarly, in engagement, clutch 107 operatively connects shaft 71 to a sprocket wheel 123, and through a chain 124 and sprocket wheel 125, to the shaft 105. Sprocket wheel 125 is secured to shaft 105 for rotation therewith while sprocket wheel 123 is journaled onto the shaft 71 so that when clutch 107 is disengaged said sprocket wheel 123 and said shaft 71 are free to rotate one relative to the other.

In operation, where input shaft 71 is being driven by one or both of engines 1, 2 at a certain speed of rotation, through selective engagement of clutch 106 or clutch 107 the shaft 105 may be caused to rotate at a speed lower or a speed higher than the speed of rotation of shaft 71, according to the ratio of diameters of the sprocket wheel 120 to sprocket wheel 122 and of sprocket wheel 123 to sprocket wheel 125. For sake of illustration, as shown in the drawing, sprocket wheel 120 may be of lesser diameter than that of the sprocket wheel 122 so that when clutch 106 is engaged, shaft 105 will be turned at a speed lower than that at which shaft 71 turns, while conversely, sprocket wheel 123 may be of greater diameter than that of sprocket wheel 125 so that shaft 105 will turn at a faster speed than will shaft 71 when clutch 107 is engaged. For this reason, friction clutch 106 may hereinafter be referred to as the "low speed" friction clutch, while clutch 107 may be referred to as the "high speed" friction clutch.

To control operation of friction clutches 106, 107 a control valve device 130 is provided. Control valve device 130 may be substantially of the type disclosed and described in detail in U. S. Letters Patent No. 2,329,742, issued to Rankin J. Bush et al., Sept. 21, 1943, and assigned to the assignee of the present application. Valve device 130 is of the self-lapping type and comprises an operator's lever 131 which is movable in one direction out of a "Neutral" position in which it is shown in the drawing, toward a "Low speed" position, indicated by a dot and dash line so titled, to effect increase in pressure of fluid in a pipe 132 connected to the pressure chamber 95 of actuator 108 for engaging the "Low speed" friction clutch 106. Lever 131 is movable in the opposite direction out of "Neutral" position toward a "High speed" position for effecting increase in pressure of fluid in a pipe 133 connected to the pressure chamber 95 in the actuator 109 for effecting engagement of the "High speed" friction clutch 107. In "Neutral" position of lever 131, both pipes 132, 133 are vented to atmosphere via a pipe 134 and both the clutches 106, 107 are disengaged. In moving lever 131 out of "Neutral" in either direction toward either "Low speed" or toward "High speed" position, the characteristics of valve device 130 are such that pressure of fluid in pipe 132 or 133 will be increased gradually during the major portion of lever movement with a rapid increase in pressure effected during the final portion thereof as said lever nears one or the other of its opposite extreme limit positions. Such action assures a gentle initial engagement of the friction clutches 106, 107 and thus prevents excessive wear or damage to said clutches and equipment which otherwise might occur were such initial engagement too rapid and severe.

As a source of supply of fluid under pressure for the valve device 130, same is adapted to be connected via a pipe 135 and relay valve device 136 to the supply pipe 24.

The multiple speed transmission also comprises two position jaw type clutches 137, 138 which are operable selectively to effect operating connection between the intermediate shaft 105 and the output shaft 100 through one or the other of two pairs of sprocket and wheel and chain arrangements of different "gear ratios." Thus the output shaft 100 may be driven at two different speeds relative to the shaft 105, and since shaft 105 may be driven at two different speeds relative to speed of input shaft 71, four different speeds of the output shaft 100 relative to speed of said input shaft 71 may be obtained.

Such an arrangement may comprise one pair of sprocket wheels 141, 142 connected by a chain 143, with sprocket wheel 141 secured for rotation with shaft 105 and sprocket wheel 142 journaled onto shaft 100, and a second pair of sprocket wheels 144, 145 connected by a chain 146, with the former secured to rotate with shaft 105 and the latter journaled onto shaft 100. The ratio of the diameters of sprocket wheels 141, 142 and of sprocket wheels 144, 145 may be of any desirable values to obtain two speeds of operation of shaft 100, which, for sake of illustration, may be referred to as "Low speed" and "High speed," respectively. For this reason the clutch 137 may at times be referred to hereinafter as the "Low speed" jaw clutch and the clutch 138, as the "High speed" jaw clutch.

The jaw clutches 137, 138 may be of the usual type comprising jaws 150 attached to opposite ends of a clutch element 140 common to both of said clutches, which jaws are adapted to mesh with corresponding jaws 151 formed in integral portions of the sprocket wheels 142, 145, respectively. Clutch element 140 may be keyed to shaft 100 to allow for its axial movement and for transmitting torque thereto from one or the other of the sprocket wheels 142 or 145 when clutch 137 or 138 is engaged. In a neutral position of clutch element 140, in which it is shown in the drawing with both clutches 137, 138 disengaged, even though shaft 105 and thereby sprocket wheels 142, 145 may be rotating, shaft 100 will be idle.

For actuating the clutch element 140 to engage or disengage clutches 137, 138, a fluid pressure clutch actuator 155 is employed which comprises a cylindrical casing 156 having a piston 157 slidably disposed therein. At opposite sides of piston 157 are respective pressure chambers 158, 159 adapted to be supplied with fluid under pressure selectively for causing said piston to move within the casing in one direction or the other. Compression springs 160, 161 are disposed in chambers 158, 159, respectively, arranged to urge piston 157 in the direction of its neutral position intermediate opposite ends of the casing, in which position it is shown in the drawing. Piston 157 is operatively connected to the clutch element 140 through a piston rod 162, a link 163, and a lever 164. Lever 164 is fulcrumed intermediate its ends to a fixed pin 165 and its one end is provided with a yoke which fits in an annular groove formed in clutch 140, while its opposite end is connected to link 163. When fluid under pressure is supplied to chamber 158 in actuator 155, the clutch element 140 is brought into engagement with sprocket wheel 142 for thereby driving output shaft 100 at "Low speed," while if fluid under pressure is supplied to chamber 159 in said actuator, said clutch element engages sprocket wheel 145 to engage clutch 138 for driving shaft 100 at "High speed," relative one to the other. It will be appreciated that when fluid under pressure is supplied to one of chambers 158, 159 to effect an engagement of clutch 140, the other of said chambers will be vented to atmosphere. Upon venting of fluid under pressure from both chambers 158, 159, springs 160, 161 will act to return both clutch 140 and piston 157 to neutral.

To control engagement and disengagement of the jaw clutches 137, 138 a control valve device 170, which is similar to control valve device 130, is provided. Control valve device 170 is operable, by means of handle 131 when moved out of its "Neutral" position to its "Low speed" position, to effect a controlled build-up of pressure of fluid in a pipe 171 which is adapted to be connected to pressure chamber 158 in jaw clutch actuator 155 by way of an interlock valve device 172, a pipe 173, an interlock valve device 174 and a pipe 175, for effecting engagement of the "Low speed" jaw clutch 137. To furnish fluid under pressure for such operation, the valve device 170 has a connection with the supply pipe 24. When handle 131 of the control valve device 170 is moved in the opposite direction out of "Neutral" to its "High speed" position, a controlled build-up of pressure of fluid is provided in a pipe 176, which is adapted to be connected to the pressure chamber 159 in jaw clutch actuator 155 by way of an interlock valve device 177, a pipe 178, an interlock valve device 179 and a pipe 180, for effecting engagement of the "High speed" jaw clutch 138. In "Neutral" position of the handle 131 of control valve device 170 both pipes 171, 176 are vented to atmosphere by way of pipe 134. When fluid under pressure is supplied to one of pipes 171, 176 from device 170, the other of said pipes is vented to atmosphere via pipe 134.

The control apparatus further comprises relay valve devices 185, 186, double check valves 187, 188, 189, a brake cylinder 190, a governor valve device 191, and a speed governor 192.

All of the relay valve devices 136, 172, 177, 174, 179, 185 and 186 are similar to the relay valve device 27 previously described. Each of these other relay valve devices is shown in the drawing in outline and for description thereof reference may be made to description of device 27. For sake of simplicity in following their operation in subsequent description, a solid line 195 is employed in the drawing to indicate a fluid pressure communication which is established through these relay valve devices when fluid under pressure is vented from their respective control chambers 35 and a dotted line 196 is employed to indicate a fluid pressure communication which is established through said devices when fluid under pressure is supplied to their respective control chambers.

The double check valves 187, 188, 189 are shown in outline, since same are well known in the art. Each is operable to establish connection between one of two opposite inlets upon its pressurization, and an outlet, in the usual manner, so that said outlet will be pressurized when either of said inlets is pressurized and will be vented to atmosphere only when both inlets are so vented.

The brake cylinder 190 is provided as means for effecting retardation of the shaft 105 and thereby sprocket wheels 142, 145 in the transmission 72 to allow for safe engagement and disengagement of the jaw clutches 137, 138. Brake cylinder 190 may be of any suitable construction but for sake of illustration is shown simply as comprising a hollow cylindrical casing 200 in which is slidably disposed a piston 201 having the usual pressure chamber 202 at its one side and a spring chamber 202a at its opposite side, which latter chamber is constantly open to atmosphere. A brake shoe 203 is operably connected to piston 201 through a piston rod 204 for engagement with a brake drum 205 which is secured for rotation with the transmission shaft 105. Fluid under pressure supplied to the pressure chamber 202 effects engagement of shoe 203 with drum 205 through movement of piston 201, and a compression spring 206 is arranged in chamber 202a to urge said piston and brake shoe to a brake release or rest position in which they are shown in the drawing.

The governor valve device 191 may comprise a hollow casing 207 having a chamber 208 therein which is disposed a valve 209 arranged to control communication between said chamber and exhaust ports 210 open to atmosphere. Valve 209 is urged toward its closed position in which it is shown in the drawing seated on an annular rib 211 encircling ports 210 by a compression spring 212. A stem 213 is secured to valve 209 through which said valve may be caused to move away from rib 211 to open chamber 208 to atmosphere by way of ports 210. A cam 214 is disposed outside the governor valve device 191 for actuating stem 213 to open and close valve 209. Cam 214 is secured for turning movement about a pin or shaft 215 which is in turn secured to a gear 216 through which said turning movement may be effected. Cam 214 is so adapted and arranged that in turning in a clockwise direction with shaft 215, as viewed in the drawing, stem 213 will be displaced inwardly of casing 207 to open valve 209. Upon subsequent turning movement of cam 214 in the opposite direction, spring 212 will urge valve 209 to or toward its closed position.

A rack element 217, arranged to be actuated by the speed governor 192, is provided for effecting turning movement of gear 216. One end of rack element 217 is provided with teeth for meshing engagement with the teeth on gear 216 while its opposite end is operably connected to a bell crank like lever 218 in the governor 192.

The speed governor 192 may comprise a rotatable governor head 222 adapted to be rotated by the output shaft 100 of the transmission 72 through gears 223 and a shaft 224. The head 222 pivotally carries two oppositely arranged bell cranks 225 having governor weights 226 at their outer ends, while their adjacent inner ends engage a collar 227 secured to a longitudinally movable adjusting rod 228. A governor control spring 229 acts against the rod 228 in opposition to centrifugal action of bell cranks 225 on collar 227 upon rotation of head 222 by the shaft 100. A cam 230, pivotally connected to a fixed pin 231 is operable upon turning movement about said pin to increase and decrease pressure of spring 229 as desired.

The adjusting rod 228 is provided with an operating pin 232 disposed in a groove formed in one end of the lever 218 connected to rack element 217. Lever 218 is pivotally connected to a fixed pin 233, so that axial movement of rod 228 will rock lever 218 and cause axial movement of the rack element 217.

When shaft 100 is stopped or substantially so, the governor 192, lever 218, rack element 217, and governor valve 191 will be in the position in which they are shown in the drawing. When shaft 100 is turning above a certain minimum speed, which may be substantially zero, through resultant turning movement of governor head 222 and centrifugal action of cranks 225 acting on collar 227, the adjusting rod 228 is caused to move upwardly, as viewed in the drawing, and rock lever 218 in a clockwise direction about pin 233 and through rack element 217, gear 216, cam 214 and stem 213 cause valve 209 in governor valve device 191 to open. Once the shaft 100 stops turning, or substantially so, in response to the reduced centrifugal action of cranks 225 acting on collar 227, the spring 229 moves rod 228 downwardly, as viewed in the drawing, and rocks lever 218 in a counterclockwise direction about pin 233 and through rack element 217, gear 216 and cam 214 allows valve 209 to close.

Referring now to the relay valve device 136, its chamber 49 is connected to pipe 135, its chamber 50 is connected to a pipe 235 which is open to atmosphere, its chamber 45 has a connection with the pipe 24, with a choke 236 inserted therein for reasons which will become obvious hereinafter, and its control chamber 35 is connected to a pipe 237 which in turn is connected to pressure chamber 202 in brake cylinder 190, to chamber 49 in relay valve device 185, and to chamber 50 in relay valve device 186. A pipe 238 has a connection with the pipe 237 and a choke 238' is inserted in this connection for reasons which will be pointed out hereinafter. Pipe 238 is also connected to the chamber 208 in the governor valve device 191 and to the control chamber 35 in the relay valve device 186.

In relay valve device 172, chamber 50 is connected to the pipe 171, its chamber 49 is connected to the pipe 173, chamber 45 is connected to a pipe 195' which is open to atmosphere and its control chamber 35 is connected via a pipe 188' to the outlet of double check valve 188, one inlet of which is connected to said pipe 173 and the other of which is connected to a pipe 239 which also has a connection to one of the inlets of double check valve 189.

Pipe 173 has one connection with one inlet of the double check valve 187 and a connection with the chamber 45 in the relay valve device 174. Also in relay valve device 174, chamber 49 is connected to the pipe 175 which also has a connection with control chamber 35 as well as the previously mentioned connection with chamber 158 in actuator 155, chamber 50 is connected to supply pipe 24, and chamber 36, rather than being open to atmosphere as in relay valve device 27, is connected to the pipe 239 which has a connection with the corresponding chamber in relay valve device 179 and a connection with chamber 49 in relay valve device 186, as well as its previously mentioned connection with double check valves 188, 189.

In relay valve device 177, chamber 45 is connected to a pipe 240 which is open to atmosphere, chamber 50 is connected to the pipe 176, chamber 49 is connected to the pipe 178, and control chamber 35 is connected via a pipe 189' to the outlet of double check valve 189 whose opposite inlets are connected to pipes 178 and 239, respectively.

Pipe 178 also has a connection with the other inlet of double check valve 187 and a connection with chamber 45 in relay valve device 179. Also in relay valve device 179, chamber 50 is connected to the pipe 24 and chamber 49 is connected to the pipe 180, which, in addition to its connection with chamber 159 in actuator 155, has a connection with control chamber 35 in said device 179. All other chambers in relay valve device 179 are connected as previously described.

In relay valve device 185, chamber 45 is connected to supply pipe 24, chamber 50 is connected to a pipe 241 open to atmosphere by way of a choke 242, and control chamber 35 is connected to the outlet of double check valve 187 by a pipe 242'.

In relay valve device 186, the chamber 45 is connected to a pipe 243 which is open to atmosphere by way of a choke 244.

In relay valve devices 136, 172, 185 and 186, their respective chambers 36 are open to atmosphere by way of a port 17 as in the relay valve device 27.

*Operation of portion of control apparatus for controlling multiple clutch operation*

In operation, assume that the supply pipe 24 is charged with fluid under pressure and that one or both engines 1, 2 are running and driving the input shaft 71 of the multiple speed transmission at some particular speed. Control of speed of engines 1, 2 was previously described, and, since said speed does not necessarily affect operation of the transmission 72, said description will not be repeated, so for subsequent description of operation of the control of the transmission 72, assume that the speed of shaft 71 remains constant although it should be understood that same may be increased or decreased as desired by regulating the speed of the driving motor or motors through manipulation of control valve devices 15, 16 and/or 17.

Assume further, that handles 131 of control valve devices 130 and 170, for controlling operation of friction clutches 106, 107 and jaw clutches 137, 138, respectively, are in their "Neutral" positions. Pipes 132, 133 are vented to atmosphere by way of the control valve device 130, so that both friction clutches 106, 107 are disengaged, as will be understood from previous description. As a consequence, there is yet no driving connection between the input shaft 71, which is rotating, and the intermediate shaft 105, which is yet to turn so that sprocket wheels 120, 122, 123, 125, 141, 142, 144, 145 and shaft 100 are idle. The valve 209 in governor valve device 191 is closed, since shaft 100 is not turning, as will be appreciated from previous description. Pipes 171, 176 are both vented to atmosphere by way of the control valve device 170.

Relay valve devices 172, 177, operated by fluid under pressure from the relay valve device 186, for reasons which will hereinafter be brought out, are positioned to connect pipes 173, 178 to the pipes 171, 176, respectively, and are thereby vented to atmosphere.

The control chamber 35 in relay valve device 185 is thus vented to atmosphere by way of pipe 242', double check valve 187, and pipes 173, 178, so that relay valve device 185 is positioned to connect, via its communication 195, the supply pipe 24 to the pipe 237. Pipe 237 is thus charged as is the chamber 202 in the brake cylinder device 190 for applying the brake on shaft 105 and the control chamber 35 in the relay valve device 136 for cutting off supply of fluid under pressure to control valve device 130 and venting pipe 135 to atmosphere, and since the governor valve device 191 is in its closed position, the control chamber 35 in the relay valve device 186 will be charged with fluid under pressure by way of pipe 238 and choke 238'. The relay valve device 186 thus is positioned to connect pipe 237 via its communication 196 to pipe 239 which is therefore also charged with fluid under pressure, as, consequently, are the respective chambers 36 in relay valve devices 174, 179 and the control chambers 35 in the relay valve devices 172, 177 by way of double check valves 188, 189 and pipes 188', 189' as previously indicated.

Pressure of fluid in chambers 36 in the relay valve devices 174, 179, respectively, condition said devices to connect the pipes 175, 180 by way of their communications 195, to the pipes 173, 178, respectively, and thereby to atmosphere. The control chambers 35 in the respective relay valve devices 174, 179 are now open to atmosphere by way of pipes 175, 180, as are chambers 160, 161 in the fluid pressure clutch actuator 155, so that said actuator is now in its neutral position, in which it is shown in the drawing, with both jaw clutches 137, 138 disengaged.

Assume now that it is desired to engage the low speed jaw clutch 137. The operator may then move the handle 131 of the control valve device 170 to "Low speed" position and thereby effect supply of fluid under pressure from the supply pipe 24 to the pipe 171 while maintaining the pipe 176 vented to atmosphere.

Fluid under pressure thus supplied to pipe 171 will flow through communication 196 in the relay valve device 172 into pipe 173, and from pipe 173 into the upper inlet of double check valve 188, the opposite inlet of which is yet charged with fluid under pressure from pipe 239, into and through the double check valve 187 to the control chamber of the relay valve device 185 via pipe 242', and through the communication 195 in the relay valve device 174 into the pipe 175 to the control chamber of said relay valve device 174 and to the chamber 160 in the clutch actuator 155. At this time, chamber 159 in clutch actuator 155 will remain open to atmosphere by way of pipe 180, communication 195 in the relay valve device 179, the pipe 178, communication 196 in the relay valve device 177, pipe 176, and the control valve device 170. The clutch actuator 155 will then respond to engage the low speed jaw clutch 137, thereby effecting a drive connection between the intermediate shaft 105 and the output shaft 109.

At the same time, fluid under pressure thus supplied to the control chamber 35 of the relay valve device 185 renders said device responsive to vent the pipe 237 to atmosphere by way of its communication 196, the pipe 241 and choke 242. Fluid under pressure from the chamber 202 in the brake cylinder 190, from the control chamber in the relay valve device 186, via pipe 238 and choke 238', and from the control chamber in the relay valve device 136, thus flows by way of pipe 237 to atmosphere. The brake on shaft 105 is thus released and the relay valve device 136 responds to connect supply pipe 24 to the pipe 135 hence to the control valve device 130 to allow same to be effective, it being however assumed in the present description the said control valve device 130 is in neutral position causing disengagement of both friction clutches 106, 107.

In response to venting of fluid under pressure from its control chamber, the relay valve device 186 now connects the pipe 239 to atmosphere by way of its communication 195, pipe 243 and the choke 244. Fluid under pressure in chamber 36 in the relay valve devices 174, 179 is now vented to atmosphere by way of pipe 239, as well as is fluid under pressure in the control chamber 35 in the relay device 177 by way of pipe 189' and the double check valve 189 since the opposite inlet of said double check valve is at the time vented to atmosphere by way of pipe 178. The control chamber 35 in the relay valve device 172, however, remains charged with fluid under pressure from pipe 173 by way of the double check valve 188 and the pipe 188'.

In response to venting of fluid under pressure from its chamber 36, the relay valve device 174 will respond to previous pressurization of its control chamber 35 to establish connection between the supply pipe 24 via communication 196 and the pipe 175 and thereby maintain chamber 158 in jaw clutch actuator 155 charged with fluid under pressure. At this time, since its control chamber 35 is now void of fluid under pressure, the relay valve device 179 remains positioned as before even though fluid under pressure has been vented from its chamber 36, so that pipe 180, hence chamber 159, remains connected to the pipe 178 and to atmosphere. Venting of fluid under pressure from the control chamber in the relay valve device 177 renders said device responsive to connect the pipe 178 to atmosphere by way of its communication 195 and the pipe 240 rather than by way of communication 196, pipe 176 and the control valve device 170 as previously, for reasons which will hereinafter become obvious.

The purpose or purposes of chokes 236, 238', 242 and 244 hereinafter will be set forth.

If it is now desired to return the jaw clutch actuator 155 to its neutral position for effecting disengagement of the low speed jaw clutch 137 prior to subsequent engagement of the high speed jaw clutch 136, for example, or for any other reason, the operator's handle 131 on the control valve device 170 may be moved from its "Low speed" position to its "neutral" position, thereby venting fluid under pressure from the previously charged pipe 171 while the pipe 176 remains vented.

Pipe 173 is now vented to atmosphere by way of communication 196 in relay valve device 172 and the pipe 171. Venting of pipe 173 allows release of fluid under pressure from the control chamber 35 in the relay valve device 172 by way of pipe 188' and the double check valve 188 as well as from the corresponding control chamber in the relay valve device 185 by way of the pipe 242' and the double check valve 187. At this time, pipe 175 is disconnected from pipe 173 and connected to the supply pipe 24 through the relay valve device 174 as previously described, so that said pipe 175 will remain charged with fluid under pressure.

Release of fluid under pressure in the control chamber of the relay valve device 172, conditions said device to disconnect pipe 173 from the now vented pipe 171 and to connect said pipe 173 directly to atmosphere via communication 195 and pipe 195'. By such an arrangement, the status of pipe 173 may not be changed until certain operations have been performed for reasons which will hereinafter become obvious.

At the same time, fluid under pressure released from the control chamber of the relay valve device 185 renders said device responsive to disconnect the pipe 237 from the pipe 241 to atmosphere and to connect said pipe 237 to the supply pipe 24 by establishment of communication 196. Fluid under pressure is thus supplied to the chamber 202 in the brake cylinder device 190 for applying a braking force to shaft 105 (which is not yet turning since the friction clutches 106, 107 are disengaged), to the control chamber in the relay valve device 186 for again disconnecting pipe 135 from the supply pipe 24 and opening said pipe 135 to atmosphere to render control valve device 130 ineffective, and to the control chamber of the relay valve device 186 by way of pipe 238 and choke 238', since the governor valve device 191 is still in its closed position.

In response to supply of fluid under pressure to its control chamber, the relay valve device 186 effects connection between the now charged pipe 237 and the pipe 239 by establishment of its communication 196. Fluid under pressure then flows from pipe 237 into the pipe 239 to the control chamber 35 in each of relay valve devices 172, 177 by way of double check valves 188, 189 and the respective pipes 188', 189', and simultaneously to the chamber 36 in each of the relay valve devices 174, 179.

In response to supply of fluid under pressure to their control chambers, the relay valve device 172 establishes its communication 196 to connect pipe 173 to pipe 171, thence to atmosphere via control valve device 170, and the relay valve device 177 establishes its corresponding communication 196 thus connecting pipe 178 to pipe 176 and to atmosphere by way of the control valve device 170.

With fluid under pressure thus applied to its chamber 36, since its control chamber 35 is void of fluid under pressure, the relay valve device 179 remains in its position establishing communication 195 connecting the pipe 180, hence chamber 159 in actuator 155, to the pipe 178 and thereby to atmosphere. In the relay valve device 174, with supply of fluid under pressure to chamber 36 the effect of fluid under pressure in the control chamber 35 is nullified and the spring 38 returns said device to its position disestablishing communication 196 and establishing communication 195, thus disconnecting pipe 175 from the supply pipe 24 and connecting said pipe 175 to the pipe 173 open to atmosphere. Fluid under pressure then flows from the chamber 158 in the actuator 155 by way of the pipe 175, the relay valve device 174, pipe 173, relay valve device 172, the pipe 171 and the control valve device 170 to atmosphere. In response to release of fluid under pressure from its chamber 158, the jaw clutch actuator 155 returns to its neutral position through action of springs 160, 161, thereby disengaging the low speed jaw clutch 137.

Now assume that it is desired to engage the high speed jaw clutch 138, the operator then moves the handle 131 on the jaw clutch control valve device 170 from its "Neutral" position to its "High speed" position, thereby effecting supply of fluid under pressure to the pipe 176 and venting of the pipe 171.

Fluid under pressure thus supplied to the pipe 176 flows by way of communication 196 in the relay valve device 177 into the pipe 178 to one inlet of double check valve 189, the opposite inlet of which is now charged with fluid under pressure from the pipe 239, to the control chamber of the relay valve device 185 via double check valve 187 and pipe 242' and to the chamber 159 in the jaw clutch actuator 155 by way of communication 195 in the relay valve device 179 and the pipe 180. At the same time, the chamber 158 in the jaw clutch actuator 155 remains open to atmosphere by way of communication 195 in the relay valve device 174, pipe 173, communication 196 in the relay valve device 172, pipe 171 and the control valve device 170.

Fluid under pressure thus supplied to the chamber 159 in the jaw clutch actuator 155 causes movement of piston 157 to effect engagement of the high speed jaw clutch 138 through actuation of rod 162, link 163, and lever 164. Upon pressurization of pipe 180, the control chamber 35 of the relay valve device 179 becomes charged with fluid under pressure but is at this time prevented from affecting position of said device since its chamber 36 is yet also so charged.

At the same time that the high speed jaw clutch 138 is thus engaged, fluid under pressure supplied to the control chamber of the relay valve device 185 renders said device responsive to effect venting of the pipe 237 to atmosphere by way of its communication 196, the pipe 241 and choke 242 to effect release of the brake on shaft 105 through venting of fluid under pressure from chamber 202 in brake cylinder device 190 and to render the friction clutch control valve device 130 effective, through release of fluid under pressure from the control chamber of the relay valve device 136 which responds to connect the pipe 135 to the pipe 24. The action of choke 242 is to so restrict release of fluid under pressure from the pipe 237 as to allow sufficient time for engagement of the jaw clutch before the brake on shaft 105 is released and before the friction clutch control valve device 130 is rendered effective in manner as just described.

Since the governor valve device 191 is in its closed position with shaft 100 yet to turn because the friction clutches 106, 107 are still disengaged, upon venting of the pipe 237 to atmosphere as above, fluid under pressure will flow by way of pipe 238 and choke 238', the purpose of which will be described hereinafter, from the control chamber 35 in the relay valve device 186. The relay valve device 186 then responds to connect the pipe 239 to atmosphere by way of the pipe 243 and the choke 244, through establishment of communication 195. With the pipe 239 thus vented to atmosphere, the control chamber of the relay valve device 172 is thereby so vented by way of pipe 188' and double check valve 188 both inlets of which are now so vented. One inlet of the double check valve 189 is also vented by pipe 239 but due to pressurization of pipe 178 the opposite inlet of said double check valve 189 remains charged with fluid under pressure as therefore does the pipe 189' and the control chamber in the relay valve device 177. The chambers 36 in the relay valve devices 174, 179 are also now vented to atmosphere by way of said pipe 239.

Venting of fluid under pressure from the control chamber in the relay valve device 172 renders said device effective to disconnect the pipe 173 from the pipe 171 and to connect said pipe 173 to atmosphere by way of pipe 195' thus preventing the possibility of supply of fluid under pressure to pipe 173 from the control valve device 170 at this time. The relay valve device 177 with its control chamber 35 charged remains positioned connecting pipe 178 to the pressurized pipe 176. Since the control chamber 35 in the relay valve device 174 is now void of fluid under pressure, when fluid under pressure is vented from the chamber 36 therein, said device does not react to such venting and remains positioned connecting pipe 175 to pipe 173 and thereby to atmosphere. However, in the relay valve device 179, its control chamber 35 is charged with fluid under pressure at the time that fluid under pressure is vented from its chamber 36 so that said device 179 is thereby rendered responsive to establish communication 196 to connect pipe 180 to the supply pipe 24 and thereby maintain the chamber 159 in the actuator 155 charged with fluid under pressure and the high speed jaw clutch 138 engaged.

If for any reason it is now desired to effect disengagement of the high speed jaw clutch, the handle 131 on the jaw clutch control valve device 170 may be moved back to its "Neutral" position, thus effecting venting of fluid under pressure from the pipe 176 along with the pipe 171 which remains so vented. The pipe 178 is now vented to atmosphere by way of the communication 196 in the relay valve device 177 and the pipe 176, so that fluid under pressure is thus vented from the control chamber in the relay valve device 185 to again establish communication between the supply pipe 24 and the pipe 237. Fluid under pressure is then supplied to pipe 237 to again effect application of the brake on shaft 105 and to condition the relay valve device 136 to disconnect the pipe 135 from the supply pipe 24 and to connect said pipe 135 to atmosphere for rendering the control valve device 130 ineffective. At the same time, since the governor valve device 191 is still in its closed position due to the friction clutches 106, 107 not having been engaged, fluid under pressure from pipe 237 in flowing from pipe 237 through choke 238' will effect pressurization of pipe 238 and thereby the control chamber in the relay valve device 186 which then responds to connect the pipe 239 to the now charged pipe 237. Fluid under pressure from pipe 237 then flows into the pipe 239, thence to the control chamber 35 in each of the relay valve devices 172, 177 by way of the respective double check valve devices 188, 189 and the respective pipes 188', 189', and into the chamber 36 in each of the relay valve devices 174, 179.

The relay valve device 172 reacts to pressurization of its control chamber 35 to disconnect the pipe 173 from the pipe 195' open directly to atmosphere and to connect said pipe 173 to the pipe 171 now open to atmosphere, while the relay valve device 177 responds to pressurization of its corresponding control chamber to connect the pipe 178 to the pipe 176 which is also now open to atmosphere. The relay valve device 174, since its control chamber 35 is void of fluid under pressure when its chamber 36 is pressurized, will remain in its previous position connecting pipe 175 to the pipe 173 and to atmosphere by way of relay valve device 172, pipe 171 and the control valve device 170. The relay valve device 179, however, will respond upon pressurization of its chamber 36 to disconnect the pipe 180 from the supply pipe 24 and to connect said pipe 180 to the pipe 178, thereby venting said pipe 180 to atmosphere by way of the pipe 178, relay valve device 177, pipe 176 and the control valve device 170. Fluid under pressure in the chamber 159 in actuator 155, and the control chamber 35 in the relay valve device 179 is thus released to atmosphere by way of the pipe 180. The actuator 155 then assumes its neutral position, in response to release of fluid under pressure from its chamber 159, thereby effecting disengagement of the high speed jaw clutch 138 through actuation of lever 164, as will be obvious from previous description of operation of said actuator.

Assume now that the handle 131 of the jaw clutch control valve device 170 is in its "Low speed" position in which the parts of the apparatus have assumed positions in the manner as previously described in regard to moving the operator's handle 131 in control valve device 170 from its "Neutral" position to its "Low speed" position. The pipe 171 is pressurized and the pipe 176 is vented to atmosphere by control valve device 170. The control chamber 35 in the relay valve device 172 is charged with fluid under pressure from the pipe 173 which is connected to the pressurized pipe 171 by way of communication 196 in said relay valve device. The control chamber 35 in the relay valve device 185 is pressurized from pipe 173 by way of double check valve 187 so that said relay valve device 185 is connecting the pipe 237 to atmosphere by way of pipe 241 and choke 242 thereby venting the chamber 202 in brake cylinder device 190, and the control chamber 35 in the relay valve device 136 to atmosphere. The brake on shaft 105 is therefore in its released position and the relay valve device 136 is positioned connecting pipe 135 to supply pipe 24 by way of communication 195 and choke 236 so that the control valve device 130 is effective. The shaft 100 is yet to turn, so that the governor valve device 191 is in its closed position. The pipe 238 and thereby the control chamber 35 in the relay valve device 186 is vented to atmosphere by way of choke 238' and the pipe 237. The relay valve device 186 is therefore in its position connecting pipe 239 to atmosphere by way of the pipe 243 and choke 244. By way of pipe 239, the common inlets to both of the double check valves 188 and 189 are vented to atmosphere as are the respective chambers 36 in the relay valve devices 174, 179. The pipe 178 is vented to atmosphere by way of the communication 195 in relay valve device 177, the control chamber of which is open to atmosphere by way of the pipe 189' and one or the other of the opposite inlets of double check valve 189 both of which inlets are vented to atmosphere. The relay valve device 174 is in its position connecting pipe 175 to the supply pipe 24 by way of communication 196, since its control chamber 35 is pressurized from pipe 175 and its chamber 36 is vented to atmosphere by way of pipe 239. The chamber 158 in actuator 155 is pressurized from pipe 175 now connected to the supply pipe 24. The relay valve device 179 is positioned connecting the pipe 180, and thereby the chamber 159 in actuator 155 and the control chamber of said relay valve device, to the pipe 178 and thus to atmosphere. With its chamber 158 pressurized and its chamber 159 vented, the jaw clutch actuator 155 is positioned for engagement of the low speed jaw clutch 137.

Now with the control apparatus positioned and conditioned as above, assume that the operator's handle 131 of the jaw clutch control valve device 170 is moved directly from its "Low speed" position to its "High speed" position, without stopping in "Neutral" position, to effect disengagement of the low speed jaw clutch 137 and engagement of the high speed jaw clutch 138.

In "High speed" position of handle 131, the control valve device 170 supplies fluid under pressure to the previously vented pipe 176 and vents the previously charged pipe 171 to atmosphere. At this time, pressure of fluid supplied to the pipe 176 is blanked off by the relay valve device 177 which is positioned, as aforementioned, to connect pipe 178 through pipe 240 to atmosphere so that fluid under pressure in pipe 176 cannot yet reach said pipe 178. However, at the time that pipe 171 is vented, same is connected to the pipe 173 so that fluid under pressure from the control chamber 35 in relay valve device 185 will release by way of pipe 242', double check valve 187 and said pipe 173, as will fluid under pressure in the corresponding control chamber in the relay valve device 172, by way of pipe 188' and double check valve 188. At this time fluid under pressure in pipe 175 is prevented from releasing by way of pipe 173 by the relay valve device 174 which is positioned as aforedescribed to connect said pipe 175 to the supply pipe 24.

With release of fluid under pressure from its control chamber, the relay valve device 172 will respond to connect the pipe 175 to pipe 195' to atmosphere, and with release of fluid under pressure from the corresponding control chamber in the relay valve device 185 said device assumes its position to disconnect pipe 237 from pipe 241 to atmosphere and to connect said pipe 237 to the supply pipe 24 by establishment of communication 195. Fluid under pressure from supply pipe 24 then flows into pipe 237 to the chamber 202 in brake cylinder device 190 to apply the brake on shaft 105 and to the control chamber in relay valve device 136 to vent pipe 135 to atmosphere and thereby render the friction clutch control valve device 130 ineffective. At the same time, with the governor valve device 191 in its closed position, pipe 238 and thereby control chamber 35 in the relay valve device 186 becomes pressurized from pipe 237 by way of choke 238'. The relay valve device 186 then assumes its position connecting the pressurized pipe 237 to the pipe 239 by establishment of the communication 196. Fluid under pressure from pipe 237 then flows into pipe 239 to the control chamber in each of the relay valve devices 172 and 177 by way of the respective double check valves 188, 189 and into the respective chambers 36 in the relay valve devices 174, 179.

In response to supply of fluid under pressure to their respective control chambers, the relay valve device 172 will connect pipe 173 to the vented pipe 171, and the relay valve device 177 will connect the pipe 178 to the pressurized pipe 176. Fluid under pressure in pipe 178 then flows to the control chamber in the relay valve device 185 and to the chamber 159 in actuator 155 by way of pipe 180 and communication 195 in relay valve device 179. With both chambers 158, 159 in actuator 155 charged with fluid under pressure said actuator will tend to assume its neutral position disengaging clutch 137. At the same time with its chamber 36 pressurized, the relay valve device 174 assumes its position connecting pipe 175 to the pipe 173 to atmosphere by way of the communication 196 in relay valve device 172, the pipe 171 and control valve device 170. Fluid under pressure in the chamber 158 in actuator 155 is thus released by way of pipe 175, communication 195 in relay valve device 174, and pipe 173, allowing pressure of fluid in chamber 159 of said actuator to effect engagement of the high speed jaw clutch 138. The pressure of fluid in the chamber 36 in relay valve device 179 nullifies the effect of pressure of fluid in its control chamber 35, so that said device at this time remains positioned connecting pipe 180 to pipe 178.

At the time that pipe 178 is pressurized, fluid under pressure supplied to the control chamber of the relay valve device 185 will render said device responsive to establish its communication 196 again and thereby revent pipe 237 to atmosphere by way of the pipe 241 and the choke 242. Choke 242 acts to restrict release of fluid under pressure from pipe 237 to allow sufficient time for engagement of the high speed jaw clutch 138 before the brake on shaft 105 is released and the control valve device 130 is rendered effective through such release in manner aforedescribed. Fluid under pressure in pipe 238, hence control chamber 35 in the relay valve device 186, releases into the pipe 237 by way of choke 238'. The relay valve device 186 then responds to such release of fluid under pressure from its control chamber to connect the pipe 239 to atmosphere by way of pipe 243 and choke 244 through establishment of communication 195. Fluid under pressure is thus released by way of pipe 239, from the respective inlets of double check valves 188, 189 having a connection with said pipe common to both, and from the respective chambers 36 in the relay valve devices 174, 179.

With the opposite inlet of double check valve 189 pressurized from pipe 178, the pipe 189' and the control chamber in the relay valve device 177 remain pressurized when pipe 239 is vented to atmosphere and therefore the pipe 178 remains connected to the pipe 176 by way of the communication 196 in said relay valve device. Since, however, at the time that pipe 239 is vented to atmosphere, the pipe 173 is also so vented, both inlets to double check valve 188 are then vented and fluid under pressure in the control chamber of the relay valve device 172 releases to atmosphere by way of the pipe 188' and said double check valve. The relay valve device 172 then assumes its position disestablishing communication 196 and establishing communication 195 and thereby disconnects pipe 171 from pipe 173 and connects the latter pipe to pipe 195' to atmosphere.

With the relay valve device 174 in its position establishing communication 195 between pipes 175 and 173 to effect release of fluid under pressure from said pipe 175, when chamber 36 is vented to atmosphere by way of pipe 239, if pipe 175 is then void of fluid under pressure said relay valve will remain in such position since its control chamber connected to said pipe 175 will not be charged. If, on the other hand, at the time that fluid under pressure is released from its chamber 36 the pipe 175 was not yet void of fluid under pressure, there is a possibility that resultant pressure of fluid in its control chamber would effect positioning of the relay valve device 174 to reconnect said pipe 175 to supply pipe 24, as is not desired. The choke 244, however, prevents rapid release of fluid under pressure from the pipe 239, thereby chamber 36 in the relay valve device 179, so that the relatively great volume of fluid under pressure in chamber 158 in actuator 155 has ample time to release by way of pipe 175 and communication 195 in said relay valve device 174 before complete reduction in pressure of fluid in its chamber 36, so that said device then remains positioned connecting pipe 175 to pipe 173 to atmosphere by way of communication 195 in relay valve device 172 and the pipe 195'.

The high speed jaw clutch is now engaged, with handle 131 on the jaw clutch control valve device 170 in its "High speed" position after having been moved directly thereto from its "Low speed" position. The friction clutch control valve device 130 has remained in a neutral position, with both friction clutches 106, 107 disengaged.

With both of the friction clutches disengaged and the transmission yet to be operated, in manner similar to the above-described operation of the control apparatus in effecting disengagement of the low speed jaw clutch 137 and engagement of the high speed jaw clutch 138 by movement of handle 131 on the control valve device 170 directly from its "Low speed" position to its "High speed" position, it will be appreciated that conversely the high speed jaw clutch 138 may be disengaged and the low speed jaw clutch 137 reengaged by movement of said handle 131 on said control valve device 170 from its "High speed" position directly to its "Low speed" position.

According to a feature of the invention, the friction clutches 106, 107, may not be engaged until one or the other of the jaw clutches 137, 138 is first engaged. When the handle 131 on the jaw clutch control valve device 170 is in its "Neutral" position, and therefore both jaw clutches 137, 138 are disengaged, as will be appreciated from preceding description of operation, the pipe 135 for supplying fluid under pressure to the friction clutch control valve device 130 is vented to atmosphere thereby rendering said device 130 ineffective and preventing engagement of either the friction clutches 106, 107. When handle 131 on the jaw clutch control valve device is moved to either "Low speed" or "High speed" position and either the low speed jaw clutch 137 or the high speed jaw clutch 138 is therefore engaged, the pipe 135 for supplying fluid under pressure to the friction clutch control valve device 130 is connected by way of the relay valve device 136 and choke 236 to the supply pipe 24 thereby rendering said friction clutch control valve device operable to effect supply of fluid under pressure to one or the other of pipes 132, 133 for causing engagement of one or the other of friction clutches 106, 107.

Suppose now that handle 131 of the jaw clutch control valve device 170 is in "Low speed" position pressurizing pipe 171 and venting pipe 176 to atmosphere, with the low speed jaw clutch 137 in engagement and parts of the control apparatus in positions assumed after effecting such engagement as previously described and in which:

The relay valve device 172 is in its position connecting the pipe 173 to the pressurized pipe 171 and held in such position by pressure of fluid in said pipe 173 by way of the double check valve 188 and the pipe 188';

The relay valve device 185 is in its position connecting the pipe 237 to atmosphere by way of the pipe 241 and the choke 242 and is also held in such position by pressure of fluid from the pipe 173 by way of the pipe 242' and the double check valve 187;

The brake cylinder device 190 is in its release position with its chamber 202 vented to atmosphere by way of the pipe 237;

The relay valve device 136 is in its position connecting the pipe 135 to the supply pipe 24 by way of choke 236 since its control chamber is vented to atmosphere also by way of pipe 237;

The governor valve device 191 is in its closed position, in which it is shown in the drawing, closing off chamber 208, hence pipe 238 from ports 210 to atmosphere;

The relay valve device 186 is in its position connecting the pipe 239 to atmosphere by way of pipe 243 and the choke 244 and is in such position by virtue of the fact that its control chamber is vented to atmosphere by way of the pipe 238, the choke 238' and the pipe 237;

The relay valve device 174 is in its position connecting the pipe 175 to the supply pipe 24 and is held in such position by virtue of the fact that its control chamber 35 is pressurized from the supply pipe 24 via 175 while its chamber 36 is vented to atmosphere by way of the pipe 239;

And the relay valve device 179 is in its position connecting the pipe 180 to the pipe 178, hence to atmosphere, and is in such position by virtue of the fact that its control chamber 35 is vented to atmosphere by way of the pipe 180. The chamber 36 in the relay valve device 179 is also vented to atmosphere by way of pipe 239.

Assume now that with the handle 131 of the jaw clutch control valve device in "Low speed" position, with the low speed jaw clutch therefore engaged and with parts of the apparatus positioned as above defined, the handle 131 of the friction clutch control valve device 130 is moved from its "Neutral" position to either its "Low speed" position or to its "High speed" position for connecting the now pressurized pipe 135 to either the pipe 132 or 133 for effecting engagement of either the friction clutch 106 or 107 in manner as previously described.

With one or the other of the friction clutches 106, 107 engaged, shaft 105 will be driven by the input shaft 71 through either chain 121 or chain 124, and said shaft 105 in turn will drive sprocket wheels 142, 145 through chains 143, 146. Sprocket wheel 142 will be operatively connected to the output shaft 100 through jaw clutch element 140 due to engagement of the low speed jaw clutch 137, while sprocket wheel 145 will rotate freely relative to said shaft 100. Shaft 100, therefore, is caused to turn to drive whatever devices are operably connected thereto. Upon initial turning movement of shaft 100, the speed governor device 192, acting through rack element 217, gear 216 and cam 214, as previously described, will cause the valve 209 in governor valve device 191 to open, thus venting the pipe 238 to atmosphere by way of chamber 208 and ports 210 in said valve device, without affecting the status of the pipe 237 at this time since same is already vented by way of relay valve device 185.

With the output shaft 100 thus being driven at some speed proportional to the speed of the input shaft 71, assume that it is desired to change the ratio between speed of the input shaft 71 and speed of the output shaft 100. The handle 131 of the friction clutch control valve device 130 may be shifted from one position to another to disengage one friction clutch and engage the other to obtain a change in a certain speed ratio, since the friction clutches may be engaged or disengaged at any speed.

If, however, it is found desirable to effect an increase in ratio between speed of output shaft 100 to input shaft 71 through a change in jaw clutches 137, 138, handle 131 of the jaw clutch control valve device 170 may be moved from its "Low speed" position through "Neutral" to its "High speed" position while one or the other of the friction clutches 106, 107 remain engaged. During such movement of handle 131, valve device 170 will respond first to vent pipe 171 to atmosphere and then to effect supply of fluid under pressure to the pipe 176.

At this time, due to position of the relay valve device 177, the now pressurized pipe 176 is blanked off from the pipe 178 which remains open to atmosphere by way of communication 195 in said relay valve device and the pipe 240. Pipe 173, however, being connected to pipe 171 through communication 196 in the relay valve device 172 at the time said pipe 171 is vented to atmosphere will allow for release of fluid under pressure from the control chamber 35 in said relay valve device 172 by way of pipe 188' and double check valve 188 and from the corresponding control chamber in the relay valve device 185, it being realized that with venting of pipe 173 to atmosphere at this time both inlets of both of the double check valves 188, 187 will be open to atmosphere since pipes 239 and 178 are so vented. Also at the time that pipe 173 is vented to atmosphere through pipe 171, the relay valve device 174 is in its position disconnecting pipe 175 from pipe 173 and connecting said pipe 175 to the supply pipe 24, so that the chamber 158 in actuator 155 and the control chamber in said relay valve device yet remains pressurized. The relay valve device 179 remains positioned connecting pipe 180 to the vented pipe 178 since the status of its chambers 35, 36 remain unchanged. The chamber 159 in actuator 155 remains vented to atmosphere by way of the pipe 180, and with chamber 158 pressurized said actuator maintains its previous position holding the low speed jaw clutch 137 in engagement.

With fluid under pressure vented from its control chamber 35, the relay valve device 172 will assume its position connecting pipe 173 to the pipe 195' and thereby to atmosphere as before but at the same time disconnecting said pipe 173 from the vented pipe 171.

In response to venting of fluid under pressure from its control chamber, the relay valve device 185 will assume its position for disconnecting the pipe 237 from the pipe 241 to atmosphere and connecting said pipe 237 to the supply pipe 24 for effecting supply of fluid under pressure to said pipe 237 and thereby to the chamber 202 in brake cylinder device 190 and to the control chamber in the relay valve device 136 for simultaneously effecting application of the brake on shaft 105 and venting the pipe 135 to atmosphere to release fluid under pressure from whichever of the pipes 132, 133 may be charged and thereby releasing whichever of the friction clutches 106, 107 was engaged at the time, as will be understood from previous description. The driving connection between the input shaft 71 and the intermediate shaft 105 is terminated with the automatic disengagement of the previously engaged friction clutch 106 or 107 to allow application of the brake on shaft 105 to slow down and substantially stop rotation of the remaining connected parts of the transmission including the shaft 100. The handle 131 on the friction clutch control valve device 130 may remain in either "High speed" or "Low speed" position connecting one or the other of pipes 132, or 133 to the now vented pipe 135.

At the time that fluid under pressure is supplied to the pipe 237, the shaft 100 will be turning and will continue to turn after application of the brake on shaft 105 until such application slows it down to a stop. The governor 192 will maintain the valve 209 in governor valve device 191 open until substantially the time that shaft 100 ceases rotation. The pipe 238, and therefore the control chamber in relay valve device 186, will remain open to atmosphere by way of the relatively large ports 210 in the governor device 191 until the shaft 100 substantially stops. The choke 238' will allow passage of a limited volume of fluid under pressure from pipe 237 into pipe 238 which will be too limited to cause pressurization of pipe 238 when valve 209 is open. Choke 238' also prevents excessive leakage of fluid under pressure from the pipe 237 to atmosphere via pipe 238 and the unseated valve 209. As long as valve 209 is open, therefore, the relay valve device 186 will remain in its position connecting the pipe 239 to the pipe 243 to atmosphere via choke 244 thus maintaining the relay valve devices 174 and 177 in their positions preventing release of fluid under pressure from chamber 158 and supply of fluid under pressure to chamber 159, respectively, in the jaw clutch actuator 155 which therefore remains in its position holding the low speed jaw clutch 137 in engagement.

When the brake on shaft 105 effects stopping of shaft 100, or substantial stopping thereof, and the valve 209 in the governor valve device 191 is therefore closed by action of the speed governor 192, fluid under pressure flowing through choke 238' from pipe 237 into pipe 238 and the control chamber 35 in the relay valve device 186 will effect pressurization thereof and cause said relay valve device to assume its position connecting pipe 239 to the pressurized pipe 237 so that fluid under pressure will then flow from said pipe 237 into said pipe 239.

Fluid under pressure thus supplied to the pipe 239 will then flow to the respective control chambers in both the relay valve devices 172, 177 by way of the respective double check valves 188, 189 and pipes 188', 189' and to the respective chambers 36 in the relay valve devices 174, 179.

The relay valve devices 172, 177 respond upon supply of fluid under pressure to their respective control chambers 35 to disestablish their respective communication 195 and to establish their communication 196, connecting pipe 173 to the vented pipe 171 and connecting the pipe 178 to the pressurized pipe 176, respectively, to allow fluid under pressure to flow from said pipe 176 into said pipe 178.

At the same time, fluid under pressure supplied to the chamber 36 in the relay valve device 174 will nullify the effect of pressure of fluid in its control chamber 35 and render said device responsive to disconnect the pipe 175 from the supply pipe 24 and to connect said pipe 175 to the pipe 173. Fluid under pressure in the chamber 158 in the jaw clutch actuator 155 and in the control chamber in relay valve device 174 will then release to atmosphere by way of communication 195 in said device 174, pipe 173, communication 196 in the relay valve device 172, pipe 171 and the control valve device 170. After completion of such release of fluid under pressure from its control chamber the relay valve device 174 will remain in the same position connecting pipe 175 to pipe 173, as will be obvious.

Simultaneous supply of fluid under pressure to the chamber 36 in the relay valve device 179 will act to maintain said device in its position establishing its communication 195 to continue supply of fluid under pressure from the pipe 178 to pipe 180 and thence to the chamber 159 in the jaw clutch actuator 155 and into the control chamber of said relay valve device.

The jaw clutch actuator 155 will respond upon release of fluid under pressure from its chamber 158 and supply of fluid under pressure to its chamber 159 to move to and through its neutral position, disengaging the low speed jaw clutch 137, to its opposite extreme position for engaging the high speed jaw clutch 138, as will be understood from previous description.

At the time that fluid under pressure was supplied to the pipe 178, thence to the pipe 180 via the relay valve device 179 as above described such fluid under pressure in pipe 178 will also flow into the control chamber of the relay valve device 185, causing said device 185 to effect venting of fluid under pressure from the pipe 237 by way of pipe 241 and choke 242 for releasing the brake on shaft 105 and for effecting connection through relay valve device 136 between the supply pipe 24 and pipe 135 to the control valve device 130 and thereby to whichever one of pipes 132, 133 is connected to said pipe 135 as determined by position of handle 131 of said device 130 to cause automatic reengagement of the previously engaged friction clutch 106, or 107. The choke 242 restricts release of fluid under pressure from the pipe 237 and thereby allows sufficient time for operation of actuator 155 to disengage clutch 137 and engage clutch 138 as above described before the friction clutch 106 or 107 is automatically reengaged and the brake on shaft 105 released. The choke 236 in the branch of the supply pipe 24 connected to the relay valve device 136 acts to restrict flow of fluid under pressure from said supply pipe through said relay valve device, pipe 135, control valve device 130, and one or the other of pipes 132, 133 to one or the other of clutch actuators 108, 109 to prevent sudden shock engagement of the friction clutch 106 or 107.

With automatic reengagement of one or the other of the friction clutches 106, 107, and engagement of the high speed jaw clutch 138, the shaft 105 will again be driven by input shaft 71 through either chain 121 or the chain 124, and said shaft 105 in turn will drive the output shaft 100 through chain 146 and the now engaged high speed jaw clutch 138.

Substantially at the time that the output shaft 100 begins to turn, the speed governor 192 will effect opening of the valve 209 in the governor valve device 191, thus opening the pipe 238 to atmosphere by way of the ports 210 in said device 191. Fluid under pressure in the control chamber 35 of the relay valve device 186 will then flow to atmosphere by way of pipe 238, the unseated valve 209 and ports 210 in valve device 191 if such has not already occurred by way of choke 238′ and the vented pipe 237.

Upon venting of fluid under pressure from the control chamber in the relay valve device 186, same will respond to connect the pipe 239 again to atmosphere by way of pipe 243 and choke 244 thus releasing fluid under pressure from the chamber 36 in each of the relay valve devices 174, 179 and from the control chamber in the relay valve device 172, since both inlets to double check valve 188 are then vented to atmosphere. The control chamber in the relay valve device 177 will remain pressurized by way of pipe 189′, double check valve 189 and the pipe 178 so that position of said relay valve device 177 will remain unchanged connecting said pipe 178 to the pressurized pipe 176.

Upon release of fluid under pressure from its control chamber, the relay valve device 172 will respond to disconnect pipe 173 from the vented pipe 171 and connect said pipe 173 directly to atmosphere by way of pipe 195′ through establishment of communication 195.

Upon release of fluid under pressure from its chamber 36, the relay valve device 174 will remain in its position establishing communication 195 and thereby connecting pipe 175 to the vented pipe 173 as before since the control chamber 35 in said relay valve device is open to atmosphere with said pipe 175.

Upon release of fluid under pressure from the chamber 36 in the relay valve device 179, the pressure of fluid from pipe 180 in its control chamber 35 will become effective to cause disestablishment of its communication 195 and establishment of its communication 196 to thereby disconnect pipe 180 from pipe 178 and to connect said pipe 180 to the supply pipe 24 to maintain pressure of fluid in the chamber 159 in the jaw clutch actuator 155 for holding the high speed jaw clutch 138 in engagement.

Now with the shaft 100 being driven with the high speed jaw clutch 138 engaged, assume that it is desired to effect disengagement thereof and engagement of the low speed jaw clutch 137. The operator will then move handle 131 on the jaw clutch control valve device 170 from its "High speed" position to its "Low speed" position, thereby venting the formerly pressurized pipe 176 to atmosphere and pressurizing the formerly vented pipe 171. Again assume that the handle 131 on the friction clutch control valve device 130 remains in either its "High speed" or its "Low speed" position connecting one or the other of pipes 132, 133 to the pipe 135 for effecting engagement of one or the other of the friction clutches 106, 107, as will be understood from previous description.

At this time fluid under pressure supplied to pipe 171 to effect its pressurization is prevented from reaching the pipe 173 by the relay valve device 172 which is in its position connecting pipe 173 to atmosphere by way of pipe 195′.

Venting of the pipe 176 to atmosphere, however, since the relay valve device 177 is in its position connecting the pipe 178 to the pipe 176 at the time said pipe 176 is vented to atmosphere, will effect release of fluid under pressure from the control chamber in said relay valve device 177 by way of pipe 189′ and double check valve 189 due to the fact that pipe 239 is also so vented, and from the control chamber in the relay valve device 185 by way of the pipe 242′ and double check valve 187, due to the fact that both inlets to said double check valve 187 are then vented to atmosphere via pipes 173, 178. The now vented pipe 178 is prevented from releasing fluid under pressure from the pipe 180 at this time by the relay valve device 179 in its position establishing communication 196 and connecting said pipe 180 to the supply pipe 24. When fluid under pressure is vented as above mentioned from the control chamber in relay valve device 177, said device will assume its position disconnecting the pipe 178 from the vented pipe 176 and connecting said pipe 178 directly to atmosphere by way of the pipe 240 through disestablishment of communication 196 and establishment of communication 195.

When fluid under pressure is vented as above-mentioned from the control chamber in the relay valve device 185, said device will assume its position disconnecting pipe 237 from pipe 241 to atmosphere and connecting said pipe 237 to the fluid pressure supply pipe 24 through disestablishment of communication 196 and establishment of communication 195, whereupon fluid under pressure from said pipe 24 will flow into said pipe 237 to the pressure chamber 202 in brake cylinder device 190 to apply a braking force on shaft 105 and to the control chamber of the relay valve device 136 for causing the pipe 135 to be vented to atmosphere for effecting disengagement of whichever of the friction clutches 106, 107 was in engagement, in manner similar to that previously described.

At the time that fluid under pressure is thus supplied to the pipe 237, the shaft 100 still will be turning so that valve 209 in the governor valve device 190 will be open and preventing pressurization of the pipe 238 by the restricted flow of fluid under pressure from pipe 237 through choke 238′′ into said pipe 238. The relay valve device 186 at this time therefore will remain in its position connecting pipe 239 to atmosphere via pipe 243 and thereby preventing a change in position of the relay valve device 172 to admit fluid under pressure from the charged pipe 171 to the pipe 173 and preventing a change in position of the relay valve device 179 to effect release of fluid under pressure from the pipe 180 by way of the pipe 178.

When due to automatic disengagement of the previously applied friction clutch 106 or 107 and application of a braking force on the shaft 105, the shaft 100 is brought to a stop, the governor 192 will cause the valve 209 in governor valve device 191 to close, thus allowing fluid under pressure flowing into pipe 238 through choke 238′′ to build up and effect a change in position of the relay valve device 186 to connect pipe 239 to the pressurized pipe 237. Fluid under pressure from pipe 237 will then flow into the pipe 239 by way of communication 196 in relay valve device 186 to the control chamber in each relay valve device 172, 177 by way of double check valves 188, 189, respectively, and to the chamber 36 in each of the relay valve devices 174, 179.

The relay valve device 177 will respond upon supply of fluid under pressure to its control chamber to disconnect the pipe 178 from the pipe 240 to atmosphere and to connect said pipe 178 by way of communication 196 to the pipe 176 and thereby to atmosphere.

Since its control chamber 35 is vented to atmosphere with pipe 175 at the time that its chamber 36 is thus supplied with fluid under pressure from the now pressurized pipe 239, the relay valve device 174 will remain positioned as before, connecting pipe 175 to the pipe 173 by way of communication 195.

Since, in relay valve device 179, the control chamber 35 is charged with fluid under pressure from pipe 180 at the time that fluid under pressure is supplied to the chamber 36 from pipe 239, said relay valve device will effect connection between said pipe 180 and the pipe 178, whereby fluid under pressure from the chamber 159 in actuator 155 and from said control chamber will flow by way of communication 195, pipe 178, communication 196 in the relay valve device 177, pipe 176, and control valve device 170 to atmosphere.

At the same time, in response to supply of fluid under pressure from pipe 239 to the control chamber in the relay valve device 172, said relay valve device will assume its position connecting the pressurized pipe 171 to the pipe 173, whereupon fluid under pressure will flow from said pipe 171, through the communication 196 in said relay valve device 172 into the pipe 173, thence to the control chamber of the relay valve 185 by way of double check valve 187 and to the chamber 158 in the actuator 155 by way of the communication 195 in the relay valve device 174 and pipe 175. Fluid under pressure thus supplied to the pipe 175 will also flow into the control chamber in the relay valve device 174.

With fluid under pressure thus supplied to its chamber 158 and released from its chamber 159, the actuator 155 will effect disengagement of the high speed jaw clutch 138 and engagement of the low speed jaw clutch 137.

At the time that such clutch shifting is thus being effected, the relay valve device 185 will respond to supply of fluid under pressure from pipe 178 to its control chamber to connect the pipe 237 to the pipe 241, whereupon fluid under pressure will release from the chamber 202 in brake cylinder device 190 and from the control chamber in relay valve device 136 to atmosphere by way of said pipe 237, communication 196 in said relay valve device 185, said pipe 241 and the choke 242.

Release of fluid under pressure from chamber 202 in brake cylinder device 190 will release the brake on shaft 105 while release of fluid under pressure from the control chamber in the relay valve device 136 will cause said device to effect connection between the pipe 135 and the supply pipe 24 to automatically effect engagement of the previously engaged friction clutch 106 or 107, to drive the transmission as will be appreciated from previous description.

Choke 242 so restricts release of fluid under pressure from pipe 237 as to provide sufficient time for shifting of the jaw clutch 137 or 138 before the brake on shaft 105 is released and the friction clutch 106 or 107 reengaged.

At the time that the pipe 237 is vented to atmosphere the pipe 239 is connected thereto through the relay valve device 186 which will remain in its position connecting pipes 237, 239 until fluid under pressure is released from its control chamber by way of pipe 238, choke 238' and said pipe 237 or by way of said pipe 238 and the governor valve device 191 which is caused to assume its open position upon rotation of the output shaft 100 when the friction clutch 106, or 107 is automatically reengaged as above. Upon release of fluid under pressure from its control chamber, the relay valve device 186 will disconnect the pipe 239 from the now vented pipe 237 and connect said pipe 239 to atmosphere by way of communication 195, pipe 243 and choke 244.

Upon venting of the pipe 239 to atmosphere both by way of pipe 237 and choke 242 and subsequently by way of pipe 243 and choke 244, fluid under pressure is released from the control chamber in the relay valve device 177 by way of double check valve 189 since both of its inlets are now vented to atmosphere via pipes 239 and 178, respectively, and from the chamber 36 in each of the relay valve devices 174, 179. The control chamber in the relay valve device 172, will remain pressurized by way of double check valve 188 and pipe 173.

Venting of fluid under pressure from the control chamber in the relay valve device 177 by way of pipe 239 will cause said device to disconnect the pipe 178 from the vented pipe 176 and to connect said pipe 178 to atmosphere via communication 195 and pipe 240.

Since at the time that fluid under pressure is vented via pipe 239 from its chamber 36 its control chamber is void of fluid under pressure with pipe 180, the relay valve device 179 will remain in its position connecting said pipe 180 to the pipe 178 and hence to atmosphere.

Conversely, at the time that the chamber 36 in the relay valve device 174 is vented to atmosphere by way of pipe 239 the control chamber 35 of said device is charged with fluid under pressure with pipe 175, so that said device will assume its position for disconnecting said pipe 175 from the pressurized pipe 173 and connecting said pipe 175 to the supply pipe 24 for maintaining the actuator in position for holding the low speed jaw clutch 137 engaged.

Now assume that with the output shaft 100 being driven through one or the other of the friction clutches 106 or 107 and the low speed jaw clutch 137, and with the parts of the apparatus in the positions assumed as above described, that it is desired to effect disengagement of said low speed jaw clutch. The handle 131 on the jaw clutch control valve device 170 will then be moved from its "Low speed" position to its "Neutral" position thereby causing pipe 171 to be vented to atmosphere along with the pipe 176.

With venting of the pipe 171 to atmosphere, the pipe 173 is also vented by way of the relay valve communication 196 in the relay valve device 172 and said pipe 171. Fluid under pressure is thus released via pipe 173 from the control chamber in the relay valve device 172 by way of double check valve 188 since pipe 239 is at this time also so vented, and from the control chamber in the relay valve device 185 by way of the double check valve 187, since pipe 178 is at this time also so vented.

The relay valve device 174 remains in its position disconnecting pipe 175 from pipe 173 at this time so that fluid under pressure in chamber 158 in actuator 155 will not yet release and the low speed jaw clutch 137 remains in engagement.

The relay valve device 172 responds to venting of fluid under pressure from its control chamber to disconnect pipe 173 from the now vented pipe 171 and to connect said pipe 173 to the pipe 195' to atmosphere.

The relay valve device 185 responds to venting of fluid under pressure from its control chamber by effecting connection between the pipe 237 and the supply pipe 24 whereupon fluid under pressure from said pipe 24 will flow via communication 195 in said relay valve device into said pipe 237 to the chamber 202 in the brake cylinder device 190 and to the control member in the relay valve device 186.

At this time shaft 100 will still be turning so that the governor valve device 191 will be in its open position preventing pressurization of pipe 238, hence the control chamber in the relay valve device 186, from the pipe 237 via choke 238'. The relay valve device 186 at this time remains positioned to vent pipe 239 to atmosphere via pipe 243.

Supply of fluid under pressure to chamber 202 in brake cylinder device 190 will apply the brake on shaft 105, while supply of fluid under pressure to the control chamber in relay valve device 136 causes venting of pipe 135, hence whichever of pipes 132, 133 may be connected thereto, to atmosphere to release whichever of the friction clutches 106, 107 is engaged.

With disengagement of the engaged friction clutch 106 or 107 and application of the brake on said shaft 105 and through the low speed jaw clutch 137 the shaft 100 will be brought to a stop, whereupon the governor 192 will cause the governor valve device 191 to assume its closed position, allowing fluid under pressure from pipe 237 flowing through choke 238' to pressurize the pipe 238 and control chamber in the relay valve device 186.

In response to pressurization of its control chamber, the relay valve device 186 will connect the pipe 239 to the pressurized pipe 237, whereupon fluid under pressure will flow from said pipe 237 through communication 196 in said relay valve device into said pipe 239 to the control chambers in each of the relay valve devices 172, 177 by way of double check valves 188, 189, respectively, and into the chamber 36 in each of the relay valve devices 174, 179.

Both relay valve devices 172, 177 will respond upon supply of fluid under pressure to their control chamber to effect connection between the previously vented pipes 173, 178 and the now vented pipes 171, 176 respectively, through establishment of their respective communication 196.

The relay valve device 179 will remain in its position connecting pipe 180 to the vented pipe 178 after fluid under pressure is supplied by way of pipe 239 to its chamber 36 since its control chamber is void of fluid under pressure with said pipe 180. The chamber 159 in the actuator 155 will therefore remain vented to atmosphere by way of pipe 180, communication 195 in relay valve device 179, pipe 178, communication 196 in relay valve device 177, pipe 176, and the control valve device 170.

Since, however, the control chamber 35 in the relay valve device 174 is charged with fluid under pressure from pipe 175 at the time that its chamber 36 is supplied with fluid under pressure from pipe 239, said relay valve device 174 will assume its position connecting pipe 175 to the vented pipe 173, whereupon fluid under pressure from its control chamber and from the chamber 158 in actuator 155 will flow to atmosphere by way of the pipe 175, communication 195 in said relay valve device 174, the pipe 173, communication 196 in the relay valve device 172, the pipe 171, and the control valve device 170.

With fluid under pressure thus released from its chamber 158 and with its chamber 159 also void of fluid under pressure, the jaw clutch actuator 155 will assume its neutral position causing disengagement of the low speed jaw clutch 137 along with the high speed jaw clutch 138 which remains disengaged.

It will be appreciated that with one or the other of the friction clutches 106, 107 engaged and with the high speed jaw clutch 138 engaged, said high speed jaw clutch may be disengaged in manner substantially similar to the above through movement of handle 131 on the jaw clutch control valve device 170 from its "High speed" position to its "Neutral" position. At completion of such disengagement all parts of the apparatus will assume positions identical to positions assumed after completion of disengagement of the low speed jaw clutch 137 above described. Due to such similarity and for sake of brevity such disengagement of the high speed jaw clutch 138 with one or the other of the friction clutches 106, 107 engaged will not be described.

*Summary*

It will now be seen that I have provided a fluid pressure control apparatus for controlling the operation of an engine power package comprising a plurality of power units such as a pair of internal combustion engines and a multiple speed transmission.

The control apparatus comprises means for effecting regulation of speed of the two engines independently when so employed and means for effecting compounding of their outputs as well as simultaneously effecting synchronous control of their throttle or governor position.

The control apparatus further comprises means for controlling selective engagement and disengagement of a pair of jaw clutches arranged in series with a pair of friction clutches comprised in the multiple speed transmission adapted to be driven by one or both of the internal combustion engines.

According to the invention, the control apparatus is operable to effect engagement and disengagement of either of the friction clutches when the transmission is operating at any speed with one or the other of the jaw clutches engaged. The friction clutches may not be engaged when the jaw clutches are disengaged. The jaw clutches may be engaged and disengaged only at a low speed so that means are provided the control apparatus which operate automatically to effect disengagement of whichever one of the friction clutches may be engaged and to effect application of a braking force for slowing down the transmission when a change in engagement of the jaw clutches is called for by position of an operator's handle of a jaw clutch control valve device. When the transmission is thus slowed down to a predetermined low speed (substantially stopped), the control apparatus will automatically effect the desired change in engagement of the jaw clutches as dictated by the previously positioned handle of jaw clutch control valve device, and at the same time will automatically effect reengagement of the friction clutch.

Having now described my invention, what I claim as new and desire to secure by Letters Patent, is:

1. In combination, a power input shaft, a power output shaft, differential speed power transmitting means connecting said shafts for driving said output shaft at different speeds relative to said input shaft comprising two positive type clutches associated with said output shaft and means including two friction clutches connecting said input shaft to each of said positive clutches, a first clutch control device for selectively engaging and disengaging either of said positive clutches, a second clutch control device having different clutch engaging positions for selectively engaging either of said friction clutches and also having a position for disengaging said friction clutches, and means responsive to operation of said first control means, with said second control means in either of said different clutch engaging positions, to effect disengagement and engagement of the respective friction clutch before and after, respectively, disengagement and engagement of said positive clutches.

2. In combination, a power input shaft, a power output shaft, a positive clutch operable by fluid under pressure to drive said output shaft, a friction clutch operable by fluid under pressure to transmit power from said input shaft to said positive clutch, control means for supplying and releasing fluid under pressure for controlling said positive clutch, a fluid pressure controlled relay device for supplying fluid under pressure to operate said friction clutch and for also releasing such fluid under pressure, and means responsive to operation of said control means for varying the pressure of fluid in said relay device in such a manner as to disengage said friction clutch ahead of said positive clutch and for engaging said friction clutch after engaging said positive clutch.

3. In combination, a power input shaft, a power output shaft, a positive clutch for driving said output shaft, a motor operable by fluid under pressure to render said clutch effective and upon release of such fluid under pressure to render said clutch ineffective, friction clutch means operable by fluid under pressure to transmit power from said input shaft to said positive clutch to drive said output shaft and rendered ineffective upon release of such fluid under pressure, control means for supplying fluid under pressure to and for releasing fluid under pressure from said motor, a relay device operable by fluid under pressure to establish a fluid pressure vent from said friction clutch means, and operable upon release of fluid under pressure to supply fluid under pressure to said friction clutch means, and means operative in response to supply and release of fluid under pressure by said control means to release and supply, respectively, fluid under pressure to and from said relay device.

4. In combination, a power input shaft, a power output shaft, a positive clutch for driving said output shaft, a motor operable by fluid under pressure to render said clutch effective and upon release of such fluid under pressure to render said clutch ineffective, friction clutch means operable by fluid under pressure to transmit power from said input shaft to said positive clutch to drive said output shaft and rendered ineffective upon release of such fluid under pressure, control means for supplying fluid under pressure to and for releasing fluid under pressure from said motor, a relay device operable by fluid under pressure to establish a fluid pressure vent from said friction clutch means, and operable upon release of fluid under pressure to supply fluid under pressure to said friction clutch means, means for restricting said supply of fluid under pressure to said friction clutch means, and means operative in response to supply and release of fluid under pressure by said control means to release and supply, respectively, fluid under pressure to and from said relay device.

5. In a fluid pressure control apparatus for controlling operation of a transmission comprising an input shaft adapted to be driven by power means, an output shaft for power take-off, friction clutch means and positive clutch means operable into engagement upon supply of fluid under pressure thereto, respectively, and into disengagement upon release of fluid under pressure therefrom, respectively, and means for connecting said friction and positive clutch means in series for operatively connecting said input shaft to said output shaft, in combination, a first control valve device having a first fluid pressure operating connection with said friction clutch means and operable to effect supply of fluid under pressure thereto and release of fluid under pressure therefrom, a second control valve device having a second fluid pressure operating connection with said positive clutch means and operable to effect supply of fluid under pressure thereto, and release of fluid under pressure therefrom, and interlock means operable in response to reduction in pressure of fluid in said second fluid pressure operating connection to establish communication between said first operating connection and atmosphere.

6. The combination with power means, a power delivery shaft, fluid pressure actuated friction and positive clutch means having respective driving and driven elements arranged in series for operatively connecting and disconnecting said power means to said delivery shaft, and braking means operatively connected to the driving element of said positive clutch means, of control means for effecting engagement and disengagement of said positive clutch means, and means controlled by said control means for effecting engagement and disengagement of said friction clutch means and for effecting release and application of said braking means, respectively.

7. The combination with power means, a power delivery shaft, fluid pressure actuated friction and positive clutch means having respective driving and driven elements arranged in series for operatively connecting said power means to said power delivery shaft, and braking means operable to effect braking of the driving element of said positive clutch means, of control means for effecting engagement and disengagement of said positive clutch means, means controlled by said control means for effecting engagement and disengagement of said friction clutch means and release and application of said braking means, respectively, and means operable in response to speed of rotation of said delivery shaft to render said positive clutch means non-responsive to dictates of said control means when said shaft is rotating at a speed above a certain value and to render said positive clutch means responsive to dictates of said control means when said shaft is rotating at a speed below said certain value.

8. The combination with power means, speed control means for said power means, a power delivery shaft, and fluid pressure actuated friction and positive clutch means arranged in series for operatively connecting said power means to said power delivery shaft, of control means for effecting engagement and disengagement of said positive clutch means, means controlled by said control means for effecting engagement and disengagement of said friction clutch means, and means responsive to speed of rotation of said delivery shaft to render said positive clutch means non-responsive and responsive to dictates of said control means when said shaft is rotating at speeds above and below a certain minimum value, respectively.

9. The combination with power means, a power delivery shaft, an intermediate shaft, first and second friction clutch means each operable to effect driving connection between said power means and said intermediate shaft, and first and second positive clutch means each operable to effect driving connection between said intermediate shaft and said delivery shaft, of first control means for effecting engagement and disengagement of said first and second friction clutch means selectively, second control means for effecting engagement and disengagement of said first and second positive jaw clutch means, interlock means controlled by said second control means for rendering said first control means ineffective when said second control means is operated, and means responsive to speed of rotation of said delivery shaft to render said positive clutch means and interlock means responsive and non-responsive, respectively, to dictates of said second control means when said shaft is rotating at a speed below a certain minimum value.

10. The combination with power means, speed control means for said power means, a power delivery shaft, friction clutch means and positive clutch means each having respective driving and driven elements and each operable into engagement upon supply of fluid under pressure thereto and into disengagement upon release of fluid under pressure therefrom, the driving element of said positive clutch having an operable connection with the driven element of said friction clutch, and a fluid pressure supply pipe adapted to be connected to a source of fluid under pressure, of first relay valve means operable in response to supply of fluid under pressure to a first control pipe to establish a communication between said friction clutch means and atmosphere and in response to release of fluid under pressure from said control pipe to establish a first communication between said friction clutch means and said supply pipe, a first fluid pressure conduit, control valve means operable manually to one position for effecting supply of fluid under pressure to said first fluid pressure conduit and to another position for effecting release of fluid under pressure from said first fluid pressure conduit, a second fluid pressure conduit, second relay valve means having a control chamber and operable in response to supply of fluid under pressure to its control chamber to connect said first fluid pressure conduit to said second fluid pressure conduit and operable in response to release of fluid under pressure from its control chamber to disconnect said first fluid pressure conduit from said second fluid pressure conduit and to connect said second fluid pressure conduit to atmosphere, a first double check valve having one inlet connected to said second fluid pressure conduit, another inlet, and also having an outlet connected to the control chamber of said second relay valve means, a third fluid pressure conduit connected to said positive clutch means, third relay valve means having a control chamber connected to said third fluid pressure conduit and having another fluid pressure chamber and being operable when its control chamber and fluid pressure chamber are either both void of fluid under pressure or charged with fluid under pressure to establish communication between said third fluid pressure conduit and said second fluid pressure conduit and operable when its fluid pressure chamber is void of fluid under pressure and its control chamber is charged with fluid under pressure to establish communication between said third fluid pressure conduit and said supply pipe, fourth relay valve means responsive upon supply of fluid under pressure to said second fluid pressure conduit to establish a fourth communication between said first control pipe and atmosphere and upon release of fluid under pressure from said second fluid pressure conduit to establish communication between said first control pipe and said supply pipe, a second control pipe connected to said fluid pressure chamber in said third relay valve means and to said other outlet in said double check valve, fifth relay valve means operable in response to supply of fluid under pressure to a third control pipe to establish communication between said first control pipe and said second control pipe and operable in response to release of fluid under pressure from said third control pipe to establish a fifth communication between said second control pipe and atmosphere, governor means responsive to speed of rotation of said delivery shaft and operable at speeds above a certain minimum value to establish a vent from said third control pipe to atmosphere and at speeds below said certain minimum value to disestablish said vent, and a restricted communication connecting said third control pipe to said first control pipe.

11. In a fluid pressure control apparatus for controlling operation of a transmission comprising an input shaft adapted to be driven by power means, an output shaft for power take-off, friction clutch means and positive clutch means operable into engagement upon supply of fluid under pressure thereto, respectively, and into disengagement upon release of fluid under pressure therefrom, respectively, said friction and positive clutch means being connected in series for operatively connecting said input shaft to said output shaft, in combination, a first control valve device having a first fluid pressure operating connection with said friction clutch means and operable to effect supply of fluid under pressure thereto and release of fluid under pressure therefrom, a second control valve device having a second fluid pressure operating connection with said positive clutch means and operable to effect supply of fluid under pressure thereto and release of fluid under pressure therefrom, and interlock means operable in response to reduction in pressure of fluid in said second fluid pressure operating connection to establish communication between said first operating connection and atmosphere, and choke means in said communication.

12. In combination, a power input shaft, a power output shaft, two positive clutches each for driving said output shaft, means including a friction clutch for selectively driving said positive clutches, braking means for said output shaft, an operator's control device comprising a control lever having one position for rendering one of said positive clutches effective to drive said output shaft and the other ineffective and having a second position for rendering said other positive clutch effective and said one ineffective, interlock means operable upon movement of said lever from either one of its two positions to the other to effect operation of said braking means and disengagement of said friction clutch, speed responsive means responsive to speed of rotation of said output shaft, and means included in said interlock means controlled by said speed responsive means and operable upon reduction in said speed to a chosen low degree to effect engagement of the positive clutch corresponding to the position of said control lever, disengagement of the other positive clutch, release of said braking means and engagement of said friction clutch.

13. In combination, a power input shaft, a power output shaft, two positive clutches each for driving said output shaft, means including a friction clutch for selectively driving said positive clutches, braking means for said output shaft, an operator's control device comprising a control lever having two positions corresponding to selective engagement of said two positive clutches, interlocking means responsive to movement of said lever from either one of its two positions to the other to effect operation of said braking means, and to disengage said friction clutch, means included in said interlock means controlled by speed of rotation of said output shaft and operative upon a reduction in such speed to a chosen low degree to effect operation of said interlock means to engage the positive clutch corresponding to the position of said control lever, to release said braking means and means to engage said friction clutch, means for delaying release of said braking means and engagement of said friction clutch with respect to engagement of the positive clutch, and means for delaying engagement of said friction clutch.

14. In combination with a fluid pressure supply pipe adapted to be connected to a source of fluid under pressure, of a pair of serially arranged clutch means each engaged by supply of fluid under pressure thereto and disengaged by release of fluid under pressure therefrom, one control means having a fluid pressure inlet operable manually to selectively establish connection of one of said clutch means to either said inlet or to atmosphere, and other control means operable manually to effect connection of the other of said clutch means and connection of said inlet selectively to either said supply pipe or to atmosphere.

15. The combination as set forth in claim 10, including fluid pressure braking means operable in response to supply and release of fluid under pressure to and from said first control pipe to establish and disestablish, respectively, restraint to rotation of the driving element of said positive cluch means.

16. The combination as set forth in claim 10, including fluid pressure braking means operable in response to supply and release of fluid under pressure to and from said first control pipe to establish and disestablish, respectively, restraint to rotation of the driving element of said positive clutch means, and means restricting flow of fluid under pressure through said first communication, said fourth communication, and said fifth communication.

ROY R. STEVENS.

References Cited in the file of this patent

UNITED STATES PATENTS

| Number | Name | Date |
| --- | --- | --- |
| 1,476,989 | Massey | Dec. 11, 1923 |
| 1,634,489 | Cartlidge | July 5, 1927 |
| 2,050,520 | Carter | Aug. 11, 1936 |
| 2,077,553 | Fishburn et al. | Apr. 20, 1937 |
| 2,482,274 | Hewitt et al. | Sept. 20, 1949 |

OTHER REFERENCES

Ser. No. 400,817, K. Maybach (A. P. C.) pub. May 18, 1943.